United States Patent

[11] 3,621,151

[72] Inventor James B. Wood
San Jose, Calif.
[21] Appl. No. 866,545
[22] Filed Oct. 15, 1969
[45] Patented Nov. 16, 1971
[73] Assignee GRT Corporation
Sunnyvale, Calif.

[54] FREQUENCY SELECTIVE AUDIO LIMITER
12 Claims, 1 Drawing Fig.

[52] U.S. Cl. ...................................................... 179/100.2 R, 179/100.2 K, 330/31, 330/109
[51] Int. Cl. ...................................................... H03g 5/28
[50] Field of Search .......................................... 179/100.2 R, 100.2 K; 330/21, 31, 109

[56] References Cited

UNITED STATES PATENTS 3,518,566 6/1970 Vogel ........................... 330/31

*Primary Examiner*—Robert L. Richardson
*Attorney*—Townsend and Townsend

ABSTRACT: A device for limiting the higher frequency energy of an audiofrequency spectrum being delivered to a magnetic tape recording device in which the full spectrum is amplified and the output of the amplifier is sensed to determine when the higher frequency energy is above a predetermined limit to provide a feedback signal which operates a shunt in the amplifying circuit to attenuate only the higher frequencies of the audiofrequency spectrum to maintain the higher frequencies at the output of the amplifier at a point below a predetermined level.

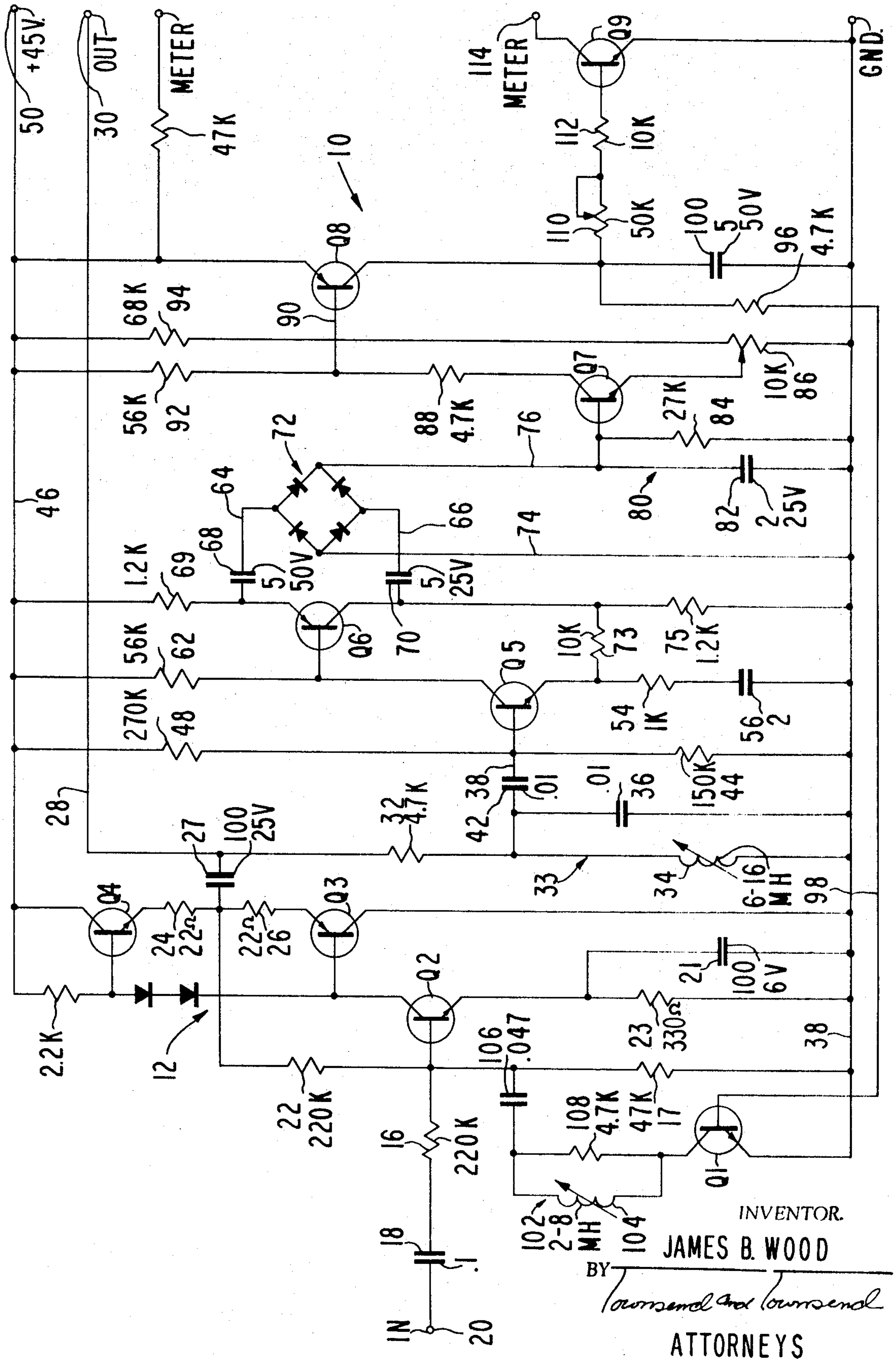
INVENTOR.
JAMES B. WOOD
BY Townsend and Townsend
ATTORNEYS

FREQUENCY SELECTIVE AUDIO LIMITER

This invention relates to improvements in the recording of electronic signals and more particularly, to apparatus for limiting the energy of selected audio signals in an audio recording system.

The present invention is directed to a circuit which operates to prevent energy in an audio signal from exceeding an established level versus frequency function. In a preferred embodiment, the circuit operates to utilize a DC signal derived from a portion of the output of a unity gain operational amplifier to control a variable current source which is coupled in series with a series L-C network connected to shunt the input at the current node of the amplifier. The means for deriving the DC signal includes a parallel L-C network having a frequency characteristic which is substantially the inverse of that provided by the gain reduction network. The result achieved with the use of the networks is that frequency response outside the frequency-level control region is not dependent upon the accurate complementary matching of the networks. Another advantage of the use of the circuit is that it introduces only negligible distortion of its own. This is due to the positioning of the series L-C network in shunt relationship to the current node of the amplifier. Finally, the circuit is simple in construction and is stable in operation.

Attempts have been made in the past to limit the high-frequency energy in an audio signal to overcome the problems of overloading in system using preemphasis-type networks. Such systems have had the problem of overloading the amplifiers and, more notably, the recording medium because of the preemphasis so as to produce distortion. One way of overcoming the problem is to cause clipping of the peaks of high-frequency signals; however, this technique introduces substantial distortion into the system.

In another attempt, the signal is divided into high and low frequencies by suitable filter means so that the gain of the high frequencies can be controlled to maintain the desired low energy level. Such a system inherently has problems in the recombining of the high and low frequencies, particularly in their phase relationships with respect to each other so that it is difficult to avoid some distortion due to phase changes.

The present invention provides a simple means which is operable to overcome the problem of overloading in a manner which is more efficient than those of the prior attempts so as to result in audio output signals whose high energy content is controlled to avoid overloading of the recording medium with which the circuit is to be utilized. The invention provides, therefore, a circuit which permits a desired frequency versus level function to be selected at which the energy can be controlled by the proper selection of circuit components so as to provide a limiting action on the energy of the high frequency available for recording.

It is, therefore, the primary object of this invention to provide an audio-limiting circuit for an audio recording system of the type which uses large amounts of recording preemphasis wherein the circuit operates to shunt input signals to an amplifier to ground in response to a signal derived from a portion of the output of the amplifier with the signal deriving means being related to the shunting means by an inverse frequency relationship, so that variable gain reduction of the amplifier can be achieved as a function of frequency and level to thereby avoid having to change the shapes of the output signals or to divide the same into high- and low-frequency components.

Another object of this invention is to provide an audio limiter of the type described wherein the shunting means comprises a series L-C network which parallels the current node of the amplifier and the network is in series with the variable current source to permit variable gain reduction with a frequency characteristic determined by the L-C network so as to effect the reduction of the open loop gain of the amplifier without introducing any substantial distortion.

Other objects of this invention will become apparent as the following specification progresses, reference being had to the accompanying drawing which, in the single figure, shows a schematic diagram of the circuit of this invention.

The circuit of this invention is broadly denoted by the numeral 10 and includes an operational amplifier 12 comprised of transistor Q2, Q3, and Q4 with the base of Q2 being the current node of the amplifier. A resistor 16 interconnects the base of Q2 with one side of a capacitor 18, the latter being coupled to the input terminal 20 of circuit 10. A resistor 22 interconnects the base of Q2 with the common junction between resistors 24 and 26, resistors 24 and 26 being coupled to the emitters of Q4 and Q3, respectively. Resistors 16 and 22 are chosen to be of the same value so that the gain of amplifier 12 is essentially unity. The collector of Q4 is coupled to a power lead 46, the latter adapted to be coupled to a source of positive voltage.

Illustrative values of the resistors, inductors and capacitors are shown in the figure adjacent to the corresponding numbers relating to the description of the circuit. Resistances are given in ohms, inductances are given in millihenries, and capacitances are given in microfarads.

The output of amplifier 12 is coupled by a capacitor 27 and a lead 28 to the output terminal 30 of circuit 10. A signal-receiving device (not shown), such as a recording system having a frequency overload characteristic, is adapted to be coupled to output terminal 30 to receive output signals therefrom.

A portion of the output signal is directed through a resistor 32 to a parallel resonant network 33 comprised of a variable inductor 34 and a capacitor 36, each connected at one end to the ground lead 38. For frequencies below the resonant frequency of network 33, the voltage across the network has a rising characteristic with frequency, and circuit values of the components of this network are selected to match the high frequency overload characteristic of the recording medium which is adapted to be coupled to output terminal 30.

The opposite ends of inductor 34 and capacitor 36 are connected by a coupling capacitor 42 and a lead 38 to the base of a transistor Q5. The base of Q5 is also coupled to ground lead 38 by a resistor 44 and to power lead 46 by a resistor 48.

The emitter of Q5 is coupled to ground lead 38 through a resistor 54 and a capacitor 56. The collector of Q5 is coupled to the base of a transistor Q6 and to lead 46 through a resistor 62. Q5 and Q6 provide voltage gain to the signal which is equalized by the L-C network 33 and deliver a split phase drive by means of leads 64 and 66 and capacitors 68 and 70, respectively, to a full wave rectifier bridge 72, the latter having a first lead 74 coupling one side of the bridge to ground lead 38 and a second lead 76 coupling the opposite side of the bridge to the base of a transistor Q7. Thus, the DC output signal from bridge 72 appears across the integrating network 80 defined by a capacitor 82 and a resistor 84 arranged in parallel between ground lead 38 and the base of Q7. This DC signal is thus proportional to the high-frequency content of the input signal program material as weighted ky equalizing network 33.

A variable resistor 86 operating as a voltage divider in conjunction with resistor 94 couples the emitter of Q7 to ground lead 38 and power lead 46. The collector of Q7 is coupled through a resistor 88 to the base of a transistor Q8 and to lead 46 through a resistor 92.

Q7 operates as a threshold detector with the emitter of Q7 set at a predetermined DC value as established by the setting of resistor 86. When the signal as rectified by bridge 72 reaches a predetermined threshold value, Q7 is brought into conduction to, in turn, bias Q8 into conduction.

The emitter of Q8 is coupled directly to lead 46 and the collector of Q8 is coupled through a resistor 96 and lead 98 to the base of a transistor Q1 operating as a variable current source whereby, when Q8 is caused to conduct, bias is delivered to the base of Q1 to cause the latter to conduct in accordance with the magnitude of the bias voltage supplied by Q8, which magnitude is determined by the high-frequency content of the input signal. A capacitor 100 is coupled between ground lead 38 and the collector of Q8, serving to remove any AC signal component from the bias voltage.

Q1, when operated as a variable current source, provides a symmetrical shunt impedance for input signals so long as the collector of Q1 is at ground potential and is not required to swing with the signal. The collector of Q1 is connected to a series L-C network 102 composed of a variable inductor 104 and a capacitor 106, the latter being coupled to the base of Q2. A resistor 108 is in parallel with inductor 104. The emitter of Q1 is coupled to ground lead 38.

The values of inductor 104 and capacitor 106 are chosen such that network 102 has an impedance versus frequency characteristic which is approximately the inverse of that of network 33. Q1, inductor 104 and capacitor 106 define a low impedance path to certain signals between the base of Q2 and ground when Q1 is biased into conduction so as to create an equalized current drain to effect the reduction in the open-loop gain of amplifier 12. Such reduction is frequency selective because of the impedance characteristic of network 102.

Network 102 is tuned to a frequency which is close to the highest frequency capable of being usefully recorded by the magnetic recording system with which the device is to be used. Furthermore, the Q of network 102 is matched so that the attenuation of the higher frequency energy through the various frequencies is substantially matched to the overload distortion characteristics of the tape recording system. The same relationship is also applied to network 33.

A portion of the bias supply for Q1 is fed to meter amplifier Q9 whose base is coupled through resistor 110 and 112 to the collector of Q8. Q1 and Q9 have similar characteristics so that the DC collector current flowing through Q9 represents relative gain reduction to a good approximation. The meter coupled to the terminal 114 in contact with the collector of Q9 generally need not have a calibrated scale since it is intended to give only a relative indication of the gain reduction of the high-frequency content of the input signal.

OPERATION

The circuit is placed in operation by coupling the same to a suitable input means such as the output of a program mixing console or a recording medium such as a tape. Output terminal 30 is coupled to a recording system, such as a conventional tape recording machine or the like, so as to permit recording of the output signal of circuit 10 on a recording medium.

The input signals are applied to the input means of amplifier 12 and the output signals therefrom are directed to output terminal 30 through lead 28. The portion of the output signal from the amplifier that is equalized by L-C network 33 is directed to Q5 which, with Q6, operates to provide a split phase drive to bridge rectifier 72.

The DC output signal developed by bridge 72 is applied across integrating network 80 and provides the signal input to the base of threshold detector Q7. When this DC signal reaches the threshold value determined by the setting of resistor 86, Q7 starts to conduct. With Q7 in conduction, bias is gated to the base of transistor Q8 in proportion to the gain of the higher frequency energy instantaneously applied at input 20 and as modified by equalizing network 33. The derived signal through transistor Q8 is sense directed to the base of transistor Q1. Transistor Q1 thereby conducts proportionately to the gain of the higher frequency energy. Transistor Q1 thus shunts L-C network 102 from the input of the amplifier to ground at an attenuation curve with respect to frequency and level which is substantially inversely proportional to the distortion generating overload characteristics of the tape recording system with which this device is intended to be used. As previously state, the curve and the frequencies to match with the recording system are determined by appropriate selections of both resonant frequencies and Q's of tune circuits 102 and 33.

What is claimed is:

1. A circuit for controlling the higher frequency energy level of a broadband audio signal comprising: an amplifier having an input and an output, sensing means within said amplifier to sense the level of energy of the higher frequencies received through said input means, attenuating means within said amplifier connected to attenuate higher frequency energy fed to said output means, said sensing means connected to said attenuating means to cause said attenuating means to cause said attenuating means to attenuate said higher frequency energy in direct proportion to the level of the higher frequency energy sensed by said sensing means.

2. A circuit for controlling the higher frequency energy level of a broadband audio signal comprising: an amplifier having an input and an output, a frequency-responsive resonant circuit connected to said amplifier having a resonant frequency at the higher frequency of the broadband audio signal, detector means connected to said tuned circuit to generate a DC signal proportional to the level of the higher frequency energy of the broadband audio signal, second tuned circuit means tuned to a resonant frequency approximate the resonant frequency of said first tuned circuit and means connected to the output of said detector means and to said second tuned circuit to shunt the input of said amplifier to ground through said second tuned circuit in proportion to the signal level from said detector means.

3. In a magnetic tape recording system in which an input signal is equalized for recording and in which audio signals above predetermined levels at the higher frequencies distort; a level controller for said recording system comprising: an amplifier connected to receive an input audio signal prior to being connected to said tape recording system, frequency-responsive means connected to said amplifier having an equalization curve substantially identical to the equalization of said tape recorder and having an audio bandpass restricted to the range of frequency above said predetermined levels, detector means connected to said sensing means to provide a DC output proportional to the level of the higher frequency energy passing said sensing means and a tuned circuit connected to said amplifier to attenuate the higher frequency energy input in said amplifier and to thereby limit the higher frequency output of said amplifier and means connecting the output of said detector means to said tuned circuit to cause said tuned circuit to attenuate the higher frequencies in direct proportion to the DC output signal from said detector means.

4. A level controller in accordance with claim 3 and wherein the Q of said tuned circuit is selected to provide a frequency bandpass proportional to the predetermined levels at which the higher frequencies distort.

5. A circuit for controlling the higher frequency energy level of a broadband audio signal comprising: first transistor means, an amplifying circuit for said first transistor means having a current summing nodal point within the circuit, a resonant circuit connected to said nodal point and through second transistor means to ground, input means adapted to apply audio signals between said nodal point and ground, said first transistor means having an output, a second tuned circuit connected to said output, detector means connected to said second tuned circuit to generate a DC signal proportional to the energy level at said output near the resonant frequency of said second tuned circuit, means connecting the output of said detector means to said second transistor means to cause said nodal point to be shunted to ground through said first tuned circuit in direct proportion to the DC signal from said detector means, said first tuned circuit and said second tuned circuit being resonant at the higher frequency of said audio signal.

6. In a circuit adapted to respond to input signals composed of a plurality of frequencies within the audio spectrum encompassing the range for relatively low to relatively high frequencies comprising: an amplifier having an input adapted to receive said input signals; means adapted to sense the amplitude of all frequencies derived from said amplifier which are within a predetermined frequency range, said sensing means providing an output signal proportional to the amplitude of said predetermined frequencies; shunt means connected to said amplifier and adapted to shunt a portion of said predetermined frequencies in proportion to the amplitude of a driving signal, the output signal of said sensing means being connected to form the driving signal for said shunting means, whereby all of said predetermined frequencies are attenuated above a predetermined amplitude.

7. A frequency-selective audio limiter circuit comprising: an amplifier having an input means adapted to receive input signals of different frequencies at the input means thereof and an output means providing an output signal in response to the reception of a signal at said input means; a parallel resonant circuit coupled to the output means for receiving a portion of the output signals thereof, said network being resonant at a predetermined frequency; an actuatable threshold detector; means coupling the network with said threshold detector to permit the detector to be actuated by a signal from said network, said detector having means for generating an actuating signal when said network signal has a predetermined amplitude; and means coupling the threshold detector with the input means of the amplifier for shunting to ground the input signals near said predetermined frequency in response to the generation of said actuation signal.

8. A circuit as set forth in claim 7, wherein said shunting means comprises a series resonant network and actuatable current-carrying device actuated as a function of said actuating signal, said series network and said device defining a path to ground when the device is actuated.

9. A circuit as set forth in claim 7, wherein said coupling means comprises a rectifier for rectifying the signal from said network before the signal is directed to the detector.

10. A circuit as set forth in claim 7, wherein said shunting means comprises a series resonant circuit having a frequency characteristic which is substantially the inverse of that of the parallel resonant circuit, and a current-passing component coupled in series with the series resonant circuit for forming therewith a path to ground in response to the generation of the actuating signal.

11. A frequency selective audio-limiting circuit for controlling the audio signal to a recording medium having a predetermined frequency overload characteristic comprising: an operational amplifier having a gain of substantially unity, said amplifier having input means for receiving signals of different frequencies and an output means providing output signals in response to the reception of input signals at said input means; a parallel resonant circuit coupled between said output means and ground and adapted to the frequency overload characteristic of the recording medium; means coupled to the network for rectifying the signals thereof; a threshold detector; means coupling the threshold detector to said rectifying means for receiving the signal rectified thereby, said detector having means for generating an actuating signal when the rectified signal is at a predetermined magnitude; a series resonant circuit coupled with the input means and having means for defining a path to ground from said input means in response to the generation of said actuating signal; and means coupling said generating means to said defining means to cause the latter to form said path as a function of said actuating signal.

12. A circuit as set forth in claim 11, wherein said generating means includes a bias-supplying device operated as a function of the generation of said actuating signal, said defining means including an actuatable current-carrying member actuated in response to a bias voltage supplied by said device.

* * * * *